(12) United States Patent
Zeller

(10) Patent No.: US 6,427,815 B1
(45) Date of Patent: Aug. 6, 2002

(54) METHOD AND DEVICE FOR REDUCING VIBRATIONS

(75) Inventor: Siegfried Zeller, Oberpframmern (DE)

(73) Assignee: Eurocopter Deutschland GmbH, Donauworth (DE)

( * ) Notice: Subject to any disclaimer, the term of this patent is extended or adjusted under 35 U.S.C. 154(b) by 0 days.

(21) Appl. No.: 09/358,343

(22) Filed: Jul. 21, 1999

(30) Foreign Application Priority Data

Jul. 21, 1998 (DE) .......................... 198 32 697

(51) Int. Cl.⁷ ............................ F16F 7/10; G05B 5/01
(52) U.S. Cl. ........................... 188/380; 318/611
(58) Field of Search ............................ 188/378, 379, 188/380, 382; 267/136, 140.1; 318/611, 460

(56) References Cited

U.S. PATENT DOCUMENTS

| | | | | |
|---|---|---|---|---|
| 3,675,471 A | * | 7/1972 | Bouche | 73/574 |
| 4,253,027 A | * | 2/1981 | Taylor | 250/445 |
| 4,420,134 A | | 12/1983 | Flannelly | 248/559 |
| 4,483,425 A | * | 11/1984 | Newman | 188/378 |
| 4,550,812 A | | 11/1985 | Mard | 188/379 |
| 4,663,496 A | * | 5/1987 | Peek | 174/42 |
| 4,749,891 A | * | 6/1988 | Sheng | 310/15 |
| 4,959,718 A | * | 9/1990 | Bennett | 348/536 |
| 5,022,201 A | * | 6/1991 | Kobori et al. | 52/167.2 |
| 5,182,887 A | * | 2/1993 | Uno | 52/167 R |
| 5,245,807 A | * | 9/1993 | Ishimaru et al. | 52/167.2 |
| 5,410,845 A | * | 5/1995 | Sakamoto et al. | 52/167.2 |
| 5,449,493 A | * | 9/1995 | Rokugawa et al. | 422/99 |
| 5,456,341 A | * | 10/1995 | Garniost et al. | 188/378 |
| 5,713,163 A | * | 2/1998 | Mutaguchi | 52/167.1 |
| 5,719,791 A | * | 2/1998 | Neumeier | 364/574 |
| 5,814,963 A | * | 9/1998 | Girard | 318/611 |
| 5,883,447 A | * | 3/1999 | Clausin | 310/51 |
| 5,944,281 A | * | 8/1999 | Pittman et al. | 244/3.12 |
| 6,045,090 A | * | 4/2000 | Krysinsky et al. | 244/17.27 |
| 6,067,853 A | * | 5/2000 | Thevenot | 73/178 H |
| 6,098,969 A | * | 8/2000 | Nagarajaiah | 267/136 |

FOREIGN PATENT DOCUMENTS

| | | |
|---|---|---|
| GB | 1357199 | 6/1974 |
| GB | 2068081 | 8/1981 |
| GB | 2224097 | 4/1990 |

* cited by examiner

Primary Examiner—Christopher P. Schwartz
(74) Attorney, Agent, or Firm—Ladas & Parry

(57) ABSTRACT

A device and method for reducing vibrations of a structure along an axis of vibration propagation, in particular in a helicopter, wherein two vibrating members of masses $m_1$ and $m_2$ are located at the ends of a spring, the spring and/or the masses being so constructed that the resonance characteristics of the assembly may be variably adjusted within a range decisive for the reduction of vibrations of the structure. The phases of the movement of the two masses and of a central point of the spring connected to the structure are measured by accelerometers and the differences of phase angle compared to the base point are maintained at 90° by moving the masses using motors to bring about the necessary change in resonance of the assembly.

14 Claims, 2 Drawing Sheets

METHOD AND DEVICE FOR REDUCING VIBRATIONS

FIELD OF THE INVENTION

The invention relates to a device for reducing the vibrations of a structure along a vibration propagation line, in particular in a helicopter, as well as to a method for reducing the vibrations of a structure.

DESCRIPTION OF THE RELATED ART

Cellular structures in helicopters are subject to considerable vibrations. These are caused for example by rotation of the main rotor and extend, inter alia, along an axis of vibration propagation inside the cabin. They are responsible, in particular, for cabin vibrations arising at the pilot's seat, which are distracting and uncomfortable for the pilot.

Vibration absorbers are conventionally provided at the main rotor to reduce the vibrations, these being capable of transmitting static forces but filtering out vibrations. A vibration absorber of this type is known from EP 0519786 B1. This consists substantially of two coaxially arranged housings, between which resilient restoring means is arranged, which connects the two housings together.

The known vibration absorber has the problem of markedly increasing the total weight of the helicopter. In addition, vibration absorbers of this type are unable to operate optimally owing to the constantly changing rotational speed of the main rotor, since the known vibration absorbers are unable to adapt their vibration-absorbing abilities quickly enough to the varying vibration times. In addition, the structure is very complex.

SUMMARY OF THE INVENTION

It is therefore an object of the present invention to provide a device for reducing vibration in a structure, which device is of simple construction and with which it is possible effectively to reduce vibrations having constantly varying vibration times. In addition, the device is designed to be easily attachable at the location to be kept free of vibrations, e. g. the pilot's seat in the cabin.

To achieve this object, the invention provides a device for reducing the vibrations of a structure along a vibration propagation line, in particular in a helicopter, in which two vibrating members of masses $m_1$ and $m_2$ are located at or near the ends of a spring, wherein the spring and/or the vibrating members are so constructed that the resonance characteristics may be variably adjusted within a range decisive for the reduction of vibrations.

Devices according to the invention can reduce the vibrations arising within a broad frequency spectrum and can be constructed to adapt automatically and rapidly to constantly changing frequencies. The device can be made compact and thus suitable for confined spaces, and may in particular be used in a helicopter, where it may easily be mounted within the cabin, e. g. in the vicinity of the pilot's seat, in order to keep this area free of vibrations. The structure in question can then be constituted by the floor in the vicinity of the seat, or even the seat or seat mounting itself. The spring can be mounted on the structure either directly or indirectly, by fixing it in a housing which in turn is fixed to the structure. The fixing can be by way of an interference fit, for example.

The assembly preferably includes means provided on the vibrating members and in the center, i.e. at the base point, of the spring, for adjusting the resonance characteristics of the device, said means being capable of sensing the movement of these components relative to the surrounding environment. Depending on the phase difference between the vibration of the vibrating member of mass $m_1$ and the vibration of the base point on the one hand and the phase difference between the vibration of the vibrating member of mass $m_2$ and the base point on the other, correcting variables derived therefrom modify the resonance characteristics of the spring/mass system until the absorption of the vibrations by the device, i.e. the reduction of the vibrations of the structure, reaches its maximum.

To determine the phase difference between the movements of the vibrating members and the movement of the base point, the device preferably comprises phase detectors having a control output, which, with the correcting variables output at that point, varies the resonance characteristics as a function of the phase differences detected by the detectors. Thus, a control circuit is formed by means of the phase detectors which senses the vibrations of the spring/mass system at the various positions using the means for measuring the movement, compares them in the phase detectors and modifies the resonance characteristics by means of the control outputs until the reduction of the vibrations of the structure reaches an optimum level. The phase detectors are advantageously multiplexers with control outputs.

It is also preferable for a comparison between the amplitude of the movements of the vibrating members to be carried out, in order to modify the resonance characteristics of the spring/mass system as a function of the amplitude difference between the movements. The amplitude differences between the two vibrating members are reduced to a specified range.

The movement-measuring means preferably take the form of acceleration sensors. However, it is perfectly possible for other detectors to be used, with which it is possible to sense the accelerated movements of the vibrating members, i.e. the vibrations. In the event of simultaneous measurement of the movements of the vibrating members for determining the phase difference and measurement of the movement of the vibrating members for determining the amplitude difference, only one means is attached to each vibrating member for movement measurement, meaning that only one acceleration sensor is provided for both measurements and the signals of the acceleration sensors are used both for phase comparison and for amplitude comparison.

Amplitude controllers having a control output are preferably used in the device to determine the amplitude difference between the movements of the two vibrating members of the masses $m_1$ and $m_2$. The correcting variables emitted via the output as a function of the amplitude difference detected by the amplitude controller then modify the resonance characteristics of the spring/mass system. The control circuit formed here by means of the amplitude controller senses the movements of the vibrating members and compares the amplitudes of the vibrations with a set value or set value interval, whereupon the control output of the amplitude controller modifies the resonance characteristics until the measured amplitude difference reaches the specified value or lies within the specified interval. The amplitude controller is advantageously a comparator with control output.

For simultaneous adjustment of the resonance characteristics by means of the phase difference between the movements of the vibrating members and the base point of the spring and adjustment via the amplitude difference between the movements of the vibrating members, the device preferably includes a logic component which receives the correcting variables from the two control circuits and combines them to form overall correcting variables for modifying the resonance characteristics.

Modification of the resonance characteristics of the spring/mass system may be effected by modifications to the spring or the spring material, or the clamping of the spring, in order to have a direct effect on or to change the spring constant and thus the resonance characteristics of the spring. However, it is advantageous for at least mass components $\Delta m_1$ and $\Delta m_2$ of the vibrating members of the masses $m_1$ and $m_2$ to be mounted so as to be displaceable along the axis of vibration propagation. This displacement of the mass centers of the vibrating members has the effect of modifying the vibration characteristics of the spring/mass system of the device, which results in a change to the resonance characteristics. It is of course also possible to displace the entire vibrating members of the masses $m_1$ and $m_2$ along the axis of vibration propagation.

Any desired means may contribute to the displacement of the mass components $\Delta m_1$ and $\Delta m_2$, but it is preferred that adjusting devices move the mass components along the axis of vibration propagation in such a way that the centers of gravity of the vibrating members are displaced outwards or inwards in accordance with the position of the mass components $\Delta m_1$ and $\Delta m_2$ predetermined by the adjusting device. The same is of course true for displacement of the entire vibrating members of the masses $m_1$ and $m_2$.

The adjusting devices are advantageously stepper motors, which effect displacement of the mass components $\Delta m_1$ and $\Delta m_2$ or the entire vibrating members of the masses $m_1$ and $m_2$ by means of spindle drives. By using stepper motors, the respective position of the motor is known and may be specifically changed. The spindle drives convert the rotational movement of the stepper motors into linear displacement of the mass components or the entire vibrating members along the axis of vibration propagation. Specific alteration of the position of the motors thus displaces the mass components by a predetermined distance in the direct direction.

The invention also relates to a method for reducing vibrations along an axis of vibration propagation, particularly in a helicopter.

A further object of the present invention is to provide a method for reducing vibrations along an axis of vibration propagation, with which, in particular in a helicopter, vibrations having varying vibration times are reduced effectively and simply.

According to the method of the invention the movements of two vibrating members of the masses $m_1$ and $m_2$ attached at the ends of a spring and the movement of the central area of the spring, i.e. the base point, are sensed and the resonance characteristics of the spring and vibrating member system are modified by means of correcting variables as a function of the phase difference between the movements on the mass side and the movement on the base point side until a target phase difference value is reached.

It is advantageous for the target value of the phase difference to be set at 90°, since, under normal test conditions, maximum vibration reduction is achieved when this is the case. However, circumstances may also arise which make it necessary for the target value of the phase difference to be set at a value other than 90°.

The movements of the vibrating members are preferably also sensed and the resonance characteristics modified by means of correcting variables as a function of the amplitude difference between the movements of the vibrating members, until the measured amplitude difference reaches a set value or lies within a set value interval.

Although it is possible, in the event of simultaneous adjustment of the resonance characteristics by means of measurement of the phase difference between the movements of the vibrating members and the movement of the base point of the spring and by means of measurement of the amplitude difference between the movements of the vibrating members, for the adjustments to be carried out in succession, it is advantageous, however, for the correcting variables resulting from the various measurements to be combined into overall correcting variables, whereby the two adjustments are prevented from influencing each other, which may happen when different modifications of the resonance characteristics are run in succession.

If the various correcting variables are combined to provide an overall correcting variable, adjustment of the resonance characteristics using measurement of the phase difference is advantageously interrupted for the entire period of adjustment using measurement of the amplitude difference. The pending adjustment process using the measured phase comparison is interrupted and not run jointly therewith, since adjustment using the amplitude comparison may influence phase comparison adjustment; the latter adjustment is thus resumed when amplitude compensation is complete.

BRIEF DESCRIPTION OF THE DRAWINGS

For a better understanding of the invention embodiments of it will now be described, by way of example, with reference to the accompanying drawings, in which.

DETAILED DESCRIPTION OF THE PREFERRED EMBODIMENTS

Figure 1:
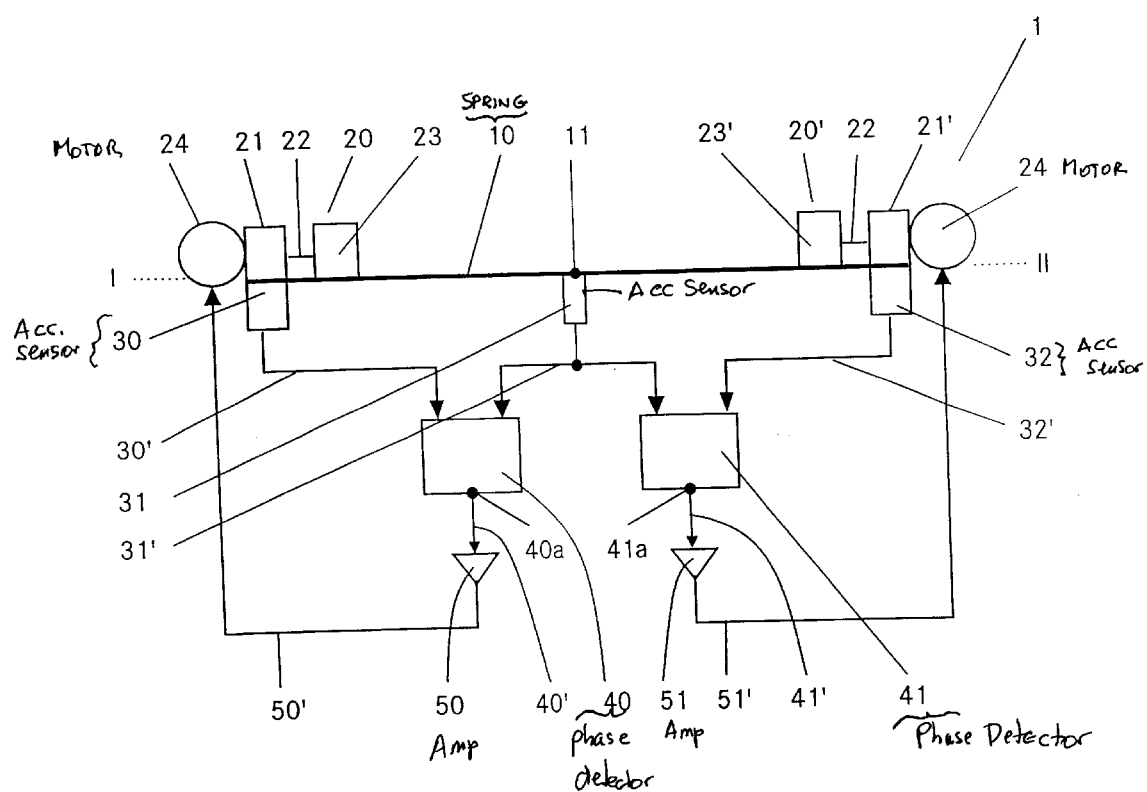
FIG. 1 illustrates in diagrammatic form a device in accordance with the invention for reducing vibrations along an axis of vibration propagation with adjustment by means of phase difference measurement.

FIG. 1 shows a device 1 for reducing the vibrations in a structure along an axis of vibration propagation I–II. The device 1 comprises a spring 10 in the form of an elongate part such as a piece of sheet metal or fiber-composite material, or a leaf spring, aligned in the direction of propagation, at the ends of which there are located two vibrating members 20, 20' of masses $m_1$ and $m_2$, forming a spring/mass system which is caused to resonate by the vibrations, thereby reducing the latter in the structure. The central region of the spring is attached by way of a base point 11 to the structure, allowing the two ends to vibrate.

The vibrating members 20, 20' are so constructed that mass components (21, 21') $\Delta m_1$ and $\Delta m_2$ are separable from the main mass components 23, 23' and are displaceable by means of spindle drives 22 and 22' respectively along the axis I–II relative to the spring, in order to modify the resonance characteristics. The main mass components 23, 23' of the vibrating members 20, 20' do not change position with respect to the spring and serve simultaneously to accommodate the spindle drives 22, 22' on the mass side; indeed these drives can be said to form part of the main masses. On the respective opposite sides of the mass components 21, 21', the spindle drives 22, 22' are accommodated by motors 24, 24', which at the same time serve to drive the spindle drives 22, 22' and thus to displace the mass components 21, 21'. Thus, the motors 24, 24' form, via the spindle drives 22, 22' driven thereby, a junction with the main mass components 23, 23', the mass components 21, 21' being displaced on spindle drives, i.e. the connections, by rotation thereof along the axis of vibration propagation. Modification of the resonance characteristics may, however, also be obtained by displacement of the vibrating members 20, 20' in their entirety along the axis of vibration propagation I–II. For this purpose, however, it is necessary to provide suspension points for the spindle drives 22, 22' on the spring on the sides remote from the motors 24, 24', since the main mass components 23, 23' are not present to fulfill this function.

To sense the movement and thus to determine the current resonance characteristics of the system consisting of spring 10 and vibrating members 20, 20', acceleration sensors 30, 31, 32 are attached at the base point 11 of the spring 10 and at the vibrating members 20, 20'. The signals 30', 32' of the movements of the acceleration sensors 30, 32 at the vibrating members are each compared in a phase detector 40 and 41 having control outputs 40a and 41a respectively with the signal 31' of the movement of the acceleration sensor 31 at the base point. The phase detectors 40, 41 check the phase relationship between the acceleration sensor 31 attached at the base point 11 and the acceleration sensors 30 and 32 on the respective vibrating members. The phase detectors output the output signals 40' or 41' via the control outputs 40a, 41a respectively, the output signals 40', 41' being amplified by signal amplifiers 50, 51 to form correcting variables for the motors 24, 24'. It goes without saying that, if phase detectors of high output power are used, signal amplifiers may be dispensed with.

If a phase detector 40 or 41 detects a deviation from the set phase difference of 90° between the respective movements at the vibrating members and the movement at the base point, it actuates the motor 24 or 24' associated with the movement at the vibrating member on the deviating side by means of the output signals 40', 41', i.e. the correcting variables 50', 51', and thus displaces the mass components 21 or 21' by means of the spindle drives 22 and 22' respectively, until the resonance characteristics have changed sufficiently for the phase difference to become 90°.

Figure 2:
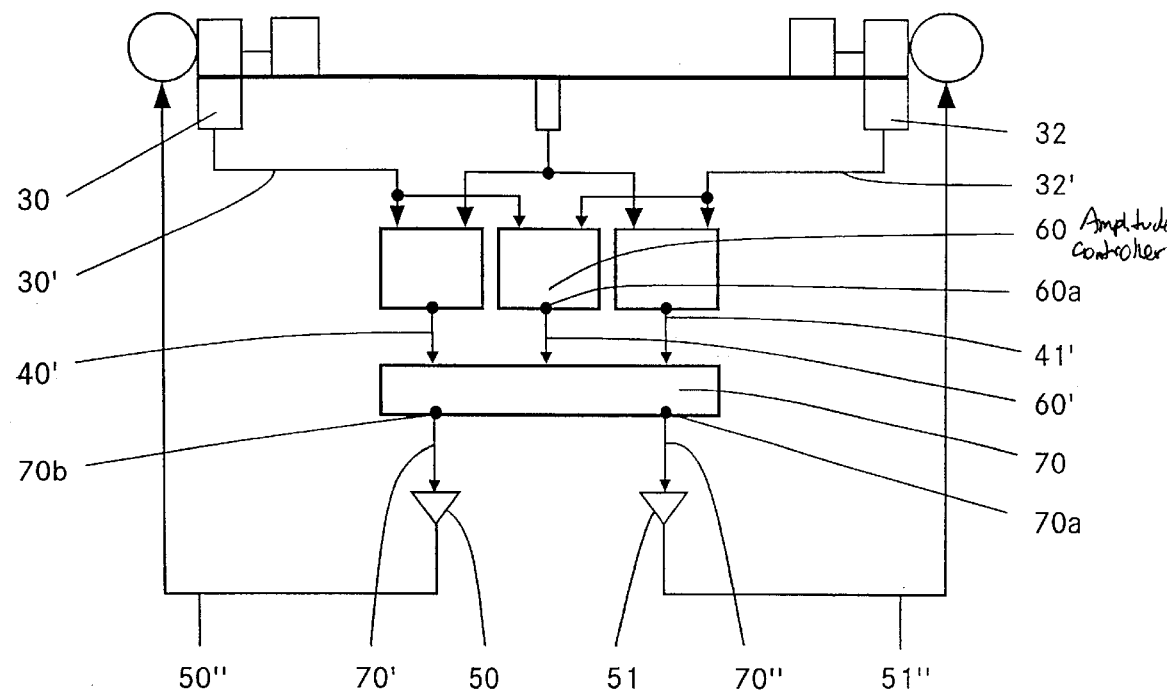
FIG. 2 shows an embodiment similar to FIG. 1 but having additional adjustment by means of amplitude difference measurement.

The embodiment shown in FIG. 2 comprises, in addition to the adjustment described in FIG. 1 using the phase difference between the movement at the vibrating members and the movement at the base point, additional adjustment by means of the amplitude difference between the movements at the vibrating members. This additional adjustment reduces the degree of possible error under extreme conditions, which may result in incorrect compensation through mutual influencing of the two vibrating members 20, 21 in their movement by means of the spring 10 in the event of adjustment solely by means of phase difference.

For this additional adjustment, an amplitude controller 60 with a control output 60a compares the signals 30' and 32' of the movements of the acceleration sensors 30, 32, at the vibration points, with each other. If the amplitudes of the two vibrations differ by more than 10%, the amplitude controller 60 reacts, via its control output 60a, to produce a control signal 60' for bringing the amplitudes back into the specified interval. To prevent the adjustments by means of phase difference and by means of amplitude difference from influencing each other, the output signals 40', 41' from the phase detectors 40, 41 and the control signal 60' are combined in a logic component 70, which reacts with output variables 70' and 70" respectively. These output variables 70' and 70" are amplified by means of signal amplifiers 50, 51 into overall correcting variables 50", 51" for the motors 24, 24' at the vibrating members 20, 20'. If the amplitudes of the two movements at the vibrating members lie within the specified range, the amplitude controller 60 does not output any control signal 60' via the control output 60a, which results in the output signals 40', 41' passing through the logic component without being influenced.

In the event of a deviation of the amplitudes from the specified interval, the output signals 40', 41' of the phase detectors 40, 41 are suppressed in the logic component 60 while adjustment via the amplitude controller 60 is active. The logic component outputs output variables 70', 70" which actuate the relevant motor 24 or 24' in such a way that the direction of the movement last effected is reversed and a mass component 21 or 21' respectively is displaced in this direction until adjustment by the amplitude controller 60 stops and adjustment by means of the phase detectors starts again, because the amplitudes of the movements of the vibrating members 20, 20' lie within the specified range. Adjustment of this type using a combination of two control circuits allows any control errors which may arise to be kept as insignificant as possible.

The device, which has been described here for use in a helicopter and which may be attached to the pilot's seat by means of the base point of the spring, may however, owing to its compact construction, be used anywhere where vibrations, in particular vibrations along an axis of vibration propagation in a system, require damping, which may also be necessary, for example, in automobile construction.

The embodiments described have a spring with two free ends, each with a weight, though in principle embodiments with only one free end are conceivable. Moreover, for cancelling vibrations in more than one direction an assembly of two or more such devices may be used, with the absorbing axes orthogonal, for instance.

What is claimed is:

1. A device for reducing vibrations of a. structure along a vibration propagation axis comprising an elongate spring having a central region with a connection for a structure for reducing vibration of said structure, two vibrating bodies each disposed at one of two opposite end portions of the spring, means for measuring movements of each of the vibrating bodies with respect to the central region of the spring, phase detectors for measuring phase difference between the movements of each of the vibrating bodies and the central region of the spring respectively, an amplitude controller for measuring amplitude difference between the movements of the vibrating bodies at the end portions of the spring and means for modifying resonance characteristics of an assembly of the spring and the vibrating bodies to reduce vibrations in the structure as a function (1) of a measured phase difference between the respective movements at the vibrating bodies and the movement at the central region of the spring and (2) of the amplitude difference between the movements of the vibrating bodies at the end portions of the spring.

2. A device according to claim 1, in which the two vibrating bodies at each end portion have masses $m_1$ and $m_2$ which include respective mass components $\Delta m_1$ and $\Delta m_2$ mounted so as to be displaceable along the axis of vibration propagation relative to the respective masses $m_1$ and $m_2$.

3. A device according to claim 2, further including adjusting devices to displace the mass components $\Delta m_1$, and $\Delta m_2$ independently along said axis.

4. A device according to claim 3, in which the adjusting devices comprise spindle drives and stepper motors.

5. A device according to claim 1, in which the phase detectors comprise multiplexers.

6. A device according to claim 1, in which the amplitude controller comprises a comparator in which amplitude values of said vibrating bodies are compared.

7. A device according to claim 1, in which the means for measuring movement comprises acceleration sensors.

8. A device according to claim 1, wherein said means for modifying the resonance characteristics comprises a logic component which receives output signals from the amplitude controller and from the phase detectors to provide overall correcting signals for modifying said resonance characteristics.

9. A device according to claim 1, in which said structure comprises a helicopter.

10. A device according to claim 1, wherein said structure comprises a vehicle having a cabin and a seat within the cabin, said device reducing vibration in the seat and being located within the cabin in association with the seat to reduce vibration in the seat in response to different operating conditions of the vehicle.

11. A method for reducing vibrations of a helicopter structure comprising connecting the helicopter structure to a central region of an elongate spring, measuring the movements of two vibrating members of masses $m_1$ and $m_2$ attached at ends of the spring relative to a movement of the central region of the spring and modifying resonance characteristics of a system consisting of the spring and the vibrating members by correcting variables derived from phase differences between the movements of the vibrating members and the movement at the central region of the spring respectively until a target phase difference value of 90° therebetween is attained and also by correcting said variables in dependence on an amplitude difference between the movements of the vibrating members until a set amplitude difference value is attained.

12. A method according to claim 11, in which the correcting variables from the amplitude difference and the correcting variables from the phase differences are combined to form overall correcting variables.

13. A method according to claim 11, in which the adjustment using phase comparison is interrupted in order to perform the adjustment using amplitude difference.

14. A method according to claim 11, in which said phase differences are adjusted by moving weight bodies forming part of the vibrating members along said spring relative to masses $m_1$ and $m_2$ respectively.

* * * * *